(12) United States Patent
Fisher

(10) Patent No.: US 8,961,326 B2
(45) Date of Patent: Feb. 24, 2015

(54) SUSPENDED FLYING RIG SYSTEM

(75) Inventor: Scott Fisher, Las Vegas, NV (US)

(73) Assignee: Tait Towers Manufacturing, LLC, Lititz, PA (US)

(*) Notice: Subject to any disclaimer, the term of this patent is extended or adjusted under 35 U.S.C. 154(b) by 361 days.

(21) Appl. No.: 13/476,469

(22) Filed: May 21, 2012

(65) Prior Publication Data

US 2012/0298825 A1    Nov. 29, 2012

Related U.S. Application Data

(60) Provisional application No. 61/489,741, filed on May 25, 2011.

(51) Int. Cl.
| | |
|---|---|
| A63G 31/16 | (2006.01) |
| F16M 11/18 | (2006.01) |
| F16M 11/04 | (2006.01) |
| F16M 11/12 | (2006.01) |
| F16M 13/02 | (2006.01) |
| A63G 31/00 | (2006.01) |

(52) U.S. Cl.
CPC ............. *F16M 11/18* (2013.01); *F16M 11/043* (2013.01); *F16M 11/12* (2013.01); *F16M 13/027* (2013.01)
USPC ............... 472/59; 472/130; 434/55; 104/112; 105/150

(58) Field of Classification Search
USPC ........ 472/49–50, 59, 75–78, 80, 130; 434/29, 434/55; 104/112, 113, 117, 117.1; 105/30, 105/148, 150, 151
See application file for complete search history.

(56) References Cited

U.S. PATENT DOCUMENTS

| | | | | |
|---|---|---|---|---|
| 6,511,381 | B1 * | 1/2003 | Cochron | 472/46 |
| 6,648,459 | B2 * | 11/2003 | Usui et al. | 347/86 |
| 7,624,684 | B2 * | 12/2009 | Morris | 104/112 |
| 8,147,344 | B2 * | 4/2012 | Crawford et al. | 472/59 |

* cited by examiner

*Primary Examiner* — Kien Nguyen

(57) ABSTRACT

A suspended flying rig system including a plurality of cables attached to a load support. In response to retraction and/or deployment of at least one of the plurality of cables, motion is provided generally within a three-dimensional working space to the load support. The motion includes at least six degrees of freedom.

10 Claims, 6 Drawing Sheets

US 8,961,326 B2

SUSPENDED FLYING RIG SYSTEM

FIELD OF THE INVENTION

The disclosure is generally related to a suspended flying rig system and method for operating a flying rig. More particularly, the disclosure includes a system and method for positioning and orienting a load, particularly within a working space.

BACKGROUND OF THE INVENTION

A motion providing device known in the art is a simulator-type apparatus that utilizes hydraulic cylinders to provide an upward force on a triangular support. The triangular support, in turn, typically supports a load. The cylinders provide force at angles which, when operating cooperatively, provide a range of motion for the support and the load mounted thereon. Other devices, such as hexapods and Stewart Platform devices operate in a similar manner. However, these devices have a limited range of motion that is limited by the stroke of the hydraulic cylinder. Larger ranges of motion require larger hydraulic cylinders, which are expensive and more difficult to operate. In addition, hydraulic systems are expensive and require frequent maintenance.

Another motion providing device includes suspended camera rigs wherein a camera is suspended from four cables at opposing corners of an area. The cables are drawn and retracted by winches to provide a motion of the camera. The motion of the camera by use of these cables is limited to (x, y, z-type) positioning within the space and cannot provide roll, pitch or yaw of the camera.

What is needed is a system and apparatus that provides a large range of positioning or orienting a load within a working space that does not suffer from the drawbacks of the prior art.

SUMMARY OF THE INVENTION

An aspect of embodiments of the present disclosure includes a suspended flying rig system and method for positioning and orienting a load support within a working space using an arrangement of cables.

Another aspect includes a suspended flying rig system including a plurality of cables attached to a load support. In response to retraction and/or deployment of at least one of the plurality of cables, motion is provided generally within a three-dimensional working space to the load support. The motion includes at least six degrees of freedom.

A further aspect includes a method for positioning and orienting a load generally within a three-dimensional working space. The method further includes providing a suspended flying system including a plurality of cables attached to a load support. The method further includes selectively retracting and deploying at least one of the plurality of cables to achieve a motion of the load support that includes at least six degrees of freedom.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a suspended flying rig system and method for positioning and orienting a load support using an arrangement of cables. What follows are exemplary embodiments.

An advantage of embodiments of the present disclosure includes a capability of selective combination of movement of a load in the horizontal direction, vertical direction and the lateral direction permitting positioning and orientation in three dimensions within a three-dimensional working space.

Another advantage of embodiments of the present disclosure includes capability of providing motion that allows pitching, yawing and rolling motion to a load support.

Still another advantage of embodiments of the present disclosure include the ability to assemble the flying rig system in a variety of locations, with little space requirements for equipment.

Figure 1:
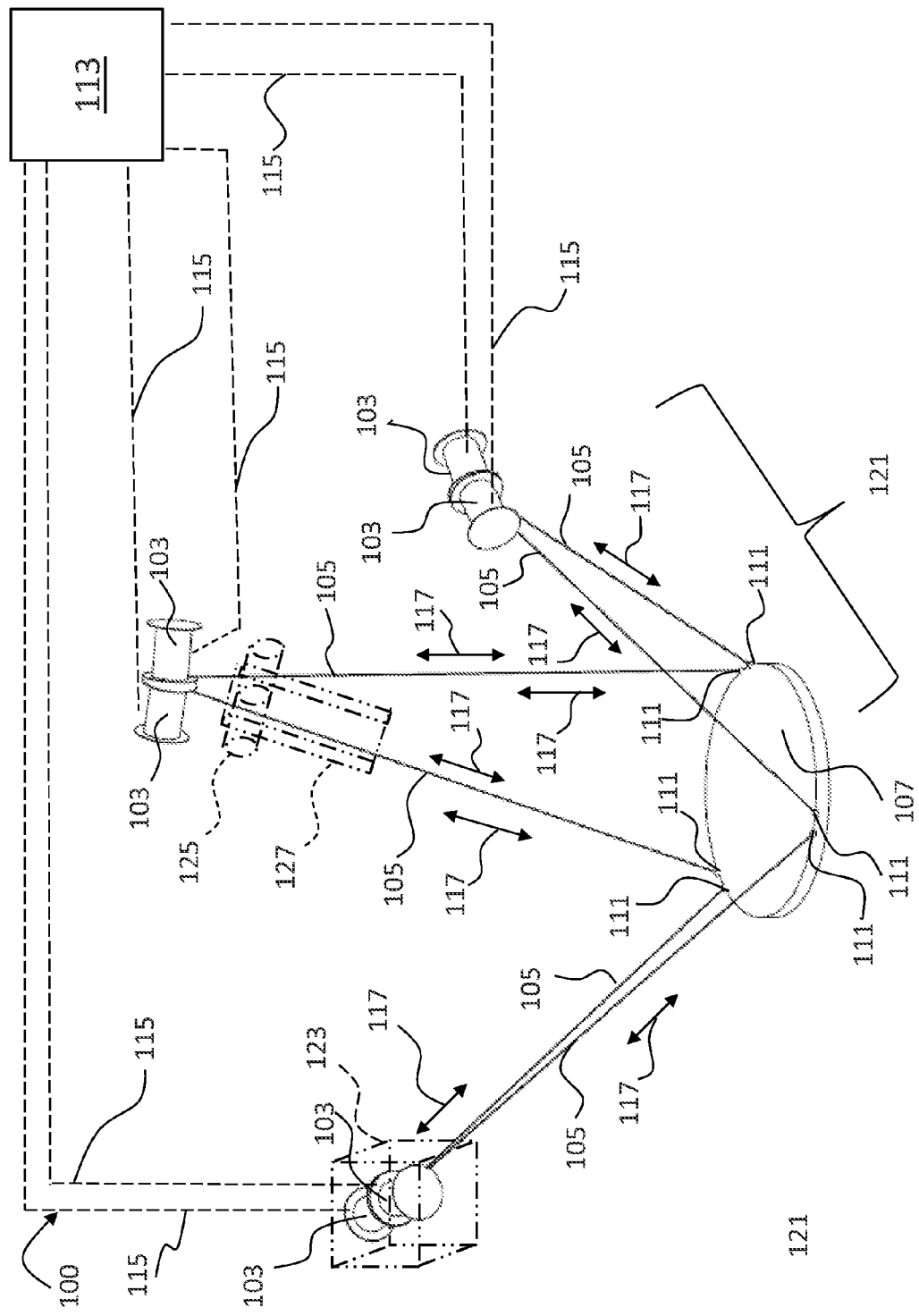
FIG. 1 shows an isometric view of a suspended flying rig system according to an exemplary embodiment of the disclosure.
Figure 2:
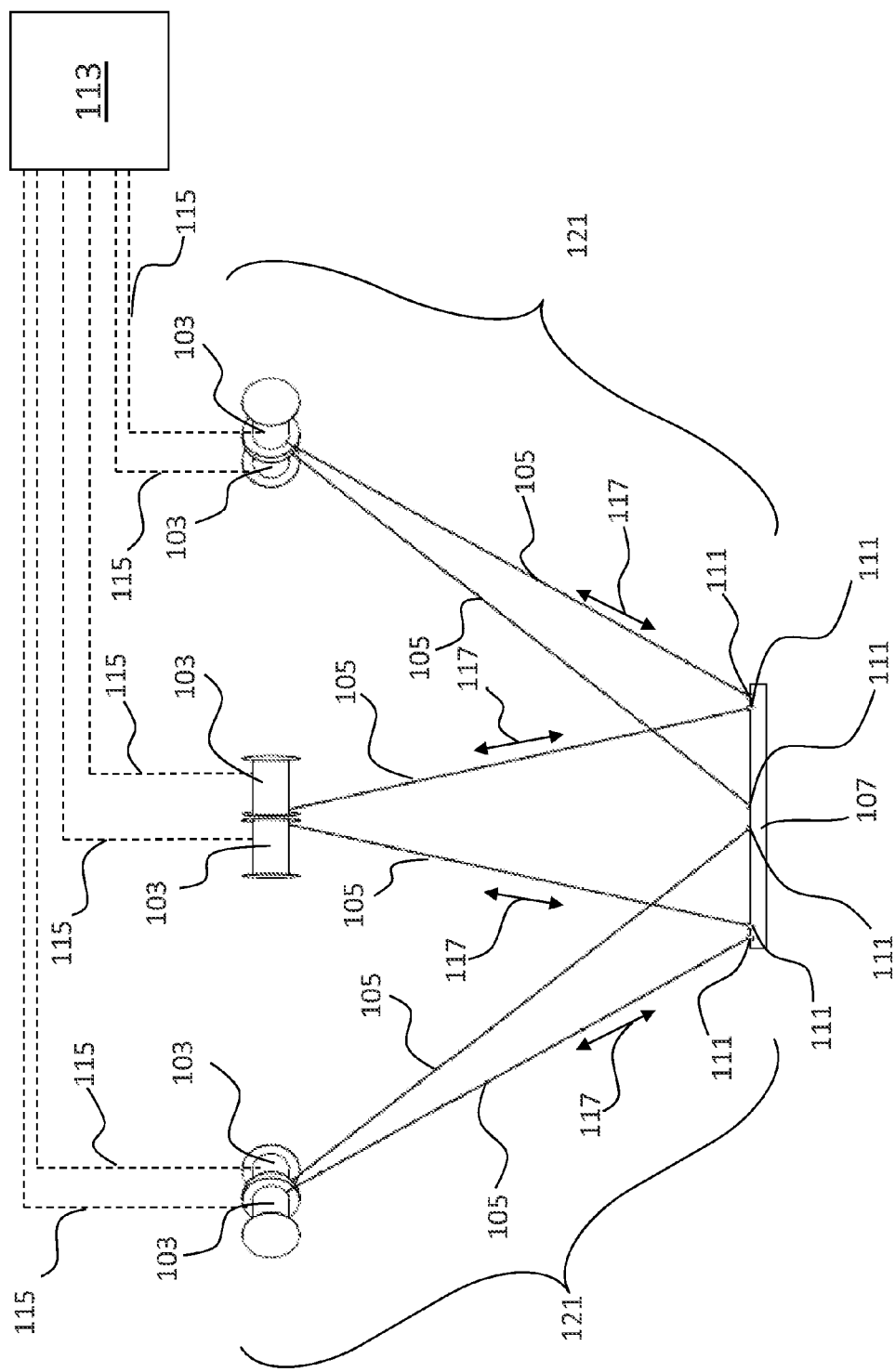
FIG. 2 shows a side view of a suspended flying rig system according to an exemplary embodiment of the disclosure.
Figure 3:
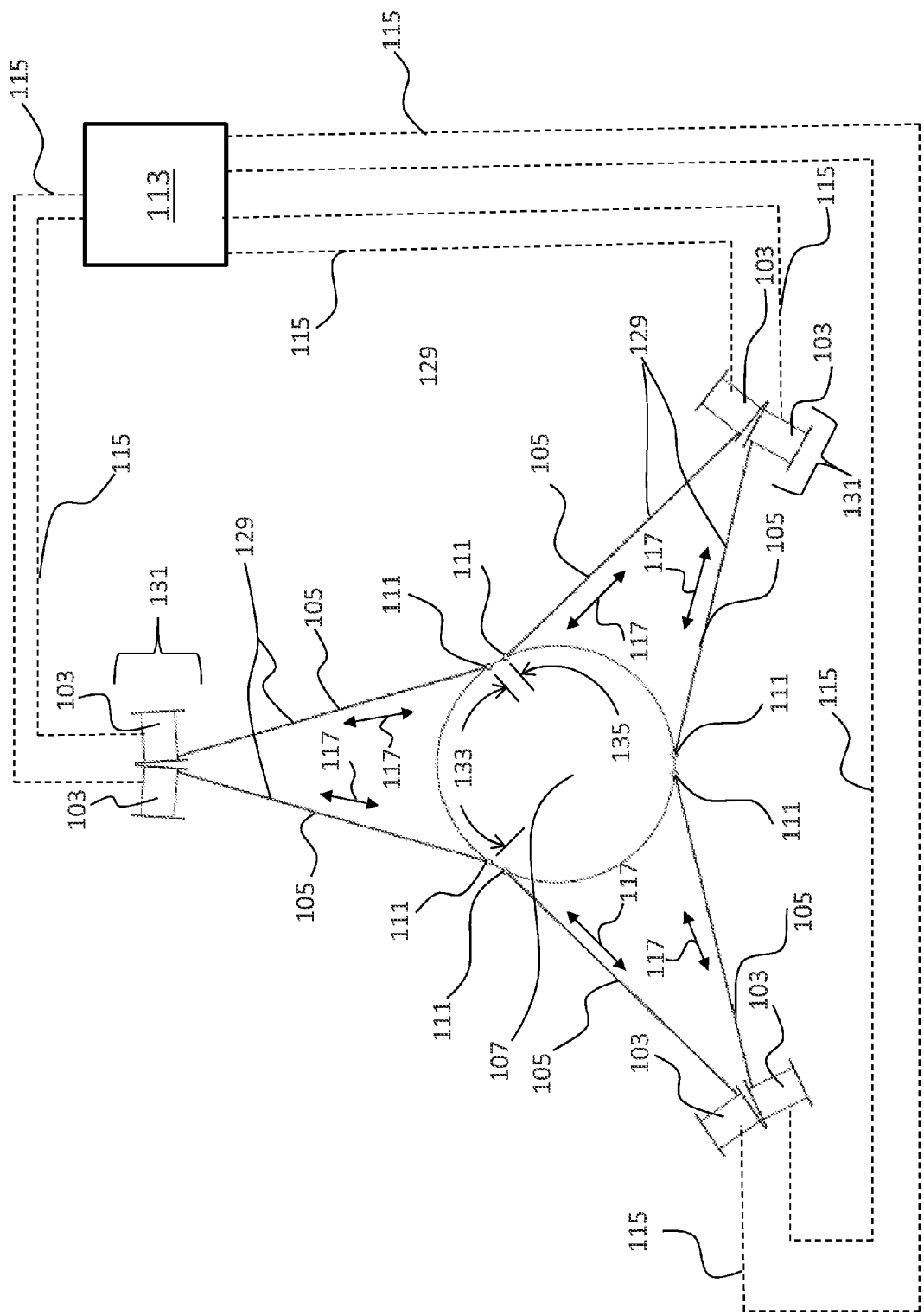
FIG. 3 shows a top view of a suspended flying rig system according to an exemplary embodiment of the disclosure.

FIG. 1-3 show a suspended flying rig system 100 according to an embodiment of the present disclosure. The flying rig system 100 may be mounted to any suitable support structure. For example, the plurality of winch assemblies 103 may be mounted to one or more support structures (a support structure 123 is shown in FIG. 1), such as a truss, ceiling structure, beam or other suitable support. The winch assemblies 103 are connected to support structure by any suitable mechanism. Suitable mechanisms include, but are not limited to, fasteners, interlocking structure, quick-release mechanisms, semi-permanent attachment devices, such as welds, or other attachment devices. The flying rig system 100 also includes a plurality of cables 105 extending from each of the winch assemblies 103 to a load support 107.

The load support 107 carries, supports, attaches to or otherwise interacts with a load. In certain embodiments, the load may include seating and a protective cage. However, the load mountable on or to the load support 107 is not so limited. For example, other embodiments the load may include cameras, equipment, lighting, personnel, ride vehicles, ride cars or other objects that are desirably positioned and/or oriented.

The load may be mounted on a load support 107, which is moved by selective retraction and deployment of cable 105 from the plurality of winch assemblies 103. By retracted, retracting, retraction or grammatical variations thereof, it is meant that cable 105 is drawn so that the length of cable 105 suspended is shortened such as by a winch assembly 103. By deployed, deploying, deployment or grammatical variations thereof, it is meant that cable 105 is extended so that the length of cable 105 suspended is increased. The cable 105 is an elongate support device capable of supporting weight and being stored and driven on the winch assembly. Suitable structures for use as cable 105 include, but are not limited to, a wire, cable, rope, tape or other structure capable of supporting weight. The cable 105 may be synthetic or non-synthetic material. Suitable materials for cable 105 may be a metal, polymer or other suitable high strength material of construction. In other embodiments, the cable 105 includes power or signal wires either integrated into the cable 105, adjacent to the cable 105 or run parallel to the cable 105 in order to provide power and/or control to the camera or other devices present as the load. In one embodiment, one or more of the cables 105 are configured for transmitting signals (for example, through electrical signals) to the load support 107, particularly when power and/or control signals are desirable for use with the load support 107 or a load on the load support. For example, in one embodiment, the cable(s) 105 include fiber-optic interiors with a durable exterior (for example, a flexible polymeric coating or a flexible metal coating). In one embodiment, one or more of the cables 105 includes an aramid fiber (for example, a polyimide fiber). In one embodiment, one or more of the cables 105 are steel cables and are of a gauge capable of supporting up to about 600 pounds on a single cable. In another embodiment, one or more of the cables 105 are braided Kevlar-jacketed.

A suitable winch assembly 103 is a powered winch or other device capable of retaining and retracting/deploying cable. One embodiment of the disclosure includes a winch assembly 103 being a powered winch having a motor, which drives a reel or set of reels which receive, store, drive or otherwise move cable 105. The arrangement of motors and reel can include any suitable arrangement known for powered winches and may include gearing, clutch assemblies, brakes, belts, chains or other structures useful for translating rotation motion from the motor to rotational motion of the reel. In addition, the reel preferably includes a helical groove or similar structure to retain cable 105. One suitable winch includes a F515 Self-Contained Flying Winch available from Fisher Technical Services Inc., Las Vegas, Nev. Although the above has been described with respect to a motor and reel to move cable 105, other structures may be utilized to provide movement to cable 105. The amount or length of cable 105 that is suspended may be altered by other methods, such as non-rotation mechanical system, hydraulic cylinders, or by other actuation devices capable of altering the amount of cable 105 that is suspended. For example, portions of the cable 105 may be folded or redirected to remove a portion of the length that is suspended from the support structure onto which the winch assemblies 103 are attached. Manipulation of the length of cable 105 suspended facilitates motion of the load support attached thereto.

Winch assemblies 103 are controlled by a controller 113 or control system. A suitable controller 113 or control system includes one or more microprocessors and graphical user interface that provides individual control to winch assemblies in response to the desired motion of load support 107. Control lines 115 provide signals and/or power to the winch assemblies. In one embodiment, the winch assemblies 103 include control systems having microprocessors that provide control to the winch assembly 103 and retract or deploy the cable 105 in response to a signal. In another embodiment, the winch assemblies 103 may receive power and/or signals from controller 113 to retract or deploy the cable 105. The arrangement of control lines 115 may include individually run cables to the winch assemblies (as shown in FIG. 1) or may include a daisy-chain arrangement wherein the line includes a single or few branches from which connections to the winch assemblies 103 are made (see e.g., FIGS. 2 and 3). The arrangement of the controller 113 may also be integrated into a large control system, such as a show or attraction where a graphical user interface and series of microprocessors are arranged to provide centralized control of the motion of load support 107.

While the above has been described with respect to winch assemblies 103 being attached to the support structures, such as trusses, other structures may be utilized to guide and suspend cables 105. In another embodiment, one or more pulleys (one set of pulleys 125 is shown in FIG. 1) may be mounted to a single support structure. The pulleys may be arranged and mounted to support the cable 105 as it is deployed or retracted by winch assembly 103. In another embodiment, the pulleys may be arranged within or on tracks or other guides (one set of tracks/guides 127 is shown in FIG. 1) that physically move the pulleys to different locations on the fly to provide dynamic re-sizing and re-shaping of the working space 121. Suitable pulleys include conventional pulley structures or other devices capable of rollably or slidably supporting a cable, wire or rope. While the pulleys in this embodiment are preferably free-rolling pulleys, a brake, motor or other rotation facilitating or retarding device may be provided to pulleys to provide additional control for positioning the load support 107. In these embodiments, the winch assembly 103 may be located at a location some distance from the pulley. In one embodiment, the winch assemblies 103 are located at ground level. In another embodiment, a portion of the winch assemblies 103 are mounted at ground level and a portion of the winch assemblies are mounted on a support structure and cables 105 extend to the pulleys. In yet another embodiment, the winch assemblies 103 are consolidated into a single location and cables 105 extend to the pulleys to allow shorter control lines 115 and easier servicing of the winch assemblies 103. The cable 105 is connected to the attachment points 111 on load support 107 by any suitable mechanism. Suitable mechanisms include, but are not limited to, loop and closed-hook mechanisms, connectors guided by magnets for alignment, bolts or other fasteners, and cable splices.

Motion of the load support 107 is facilitated by deploying or retracting cables 105 along pull directions 117. Motions, such as pitch, roll and yaw, can be provided by selectively retracting and deploying cable 105 with winch assembly 103. The motions result as the cables 105 are independently deployed or retracted, causing independent motion in each of the pull directions. The cooperative motion in the pull directions permit a range of motion in a three-dimensional space with at least six degrees of freedom. Other motions, such as lifting, can be accomplished by selectively retracting cable 105 with winch assembly 103. As shown in FIGS. 1-3, the load support 107 can be positioned and oriented, generally within working space 121. Working space 121 includes a three-dimensional space or three-dimensional working space through which the load support 107 may be positioned and oriented. As further shown in FIG. 3, pairs 131 of adjacent link position winch assemblies 103 may define a pair 129 of cables. The pair 129 of cables are connected to load support 107 by attachment points 111 separated from each other by a first spacing 133. First spacing 133 is greater than a second spacing 135 separating attachment points 111 of adjacent pairs 129 of cables. Due at least in part by the difference between first spacing 133 and second spacing 135, greater control of movement of load support 107 can be achieved by selective retraction/deployment of cables 105. In another embodiment, more than three pairs of cables may be used, and in another embodiment, spacing between cables may be different. In another embodiment, cables may not be grouped by pairs, and may have similar or different attachment point spacings connected to the load support. In other words, although FIGS. 1-3 depict a general dimension for the working space, the disclosure is not limited to the locations shown in the figures and movement, positioning and orientation may occur outside the working space 121, i.e., motion is provided generally within a three-dimensional working space 121, particularly if external forces are provided or actions, such as swinging or cable manipulation, are utilized. In addition, the dimensions of working space 121 may be altered, for example, by placement of pulleys, movement of the support structure or movement of the winch assemblies.

In an exemplary embodiment, the support structure may be mounted on rails or other movable assembly and configured to provide additional translational motion to the load support 107. For example, the working space 121 may be extended in this embodiment to include an extended space corresponding to the motion of the support structure. Likewise, the support structure may be rotated, lifted, lowered or otherwise moved to provide an additional range of motion to the load support 107 and an extension to the working space.

Figure 4:
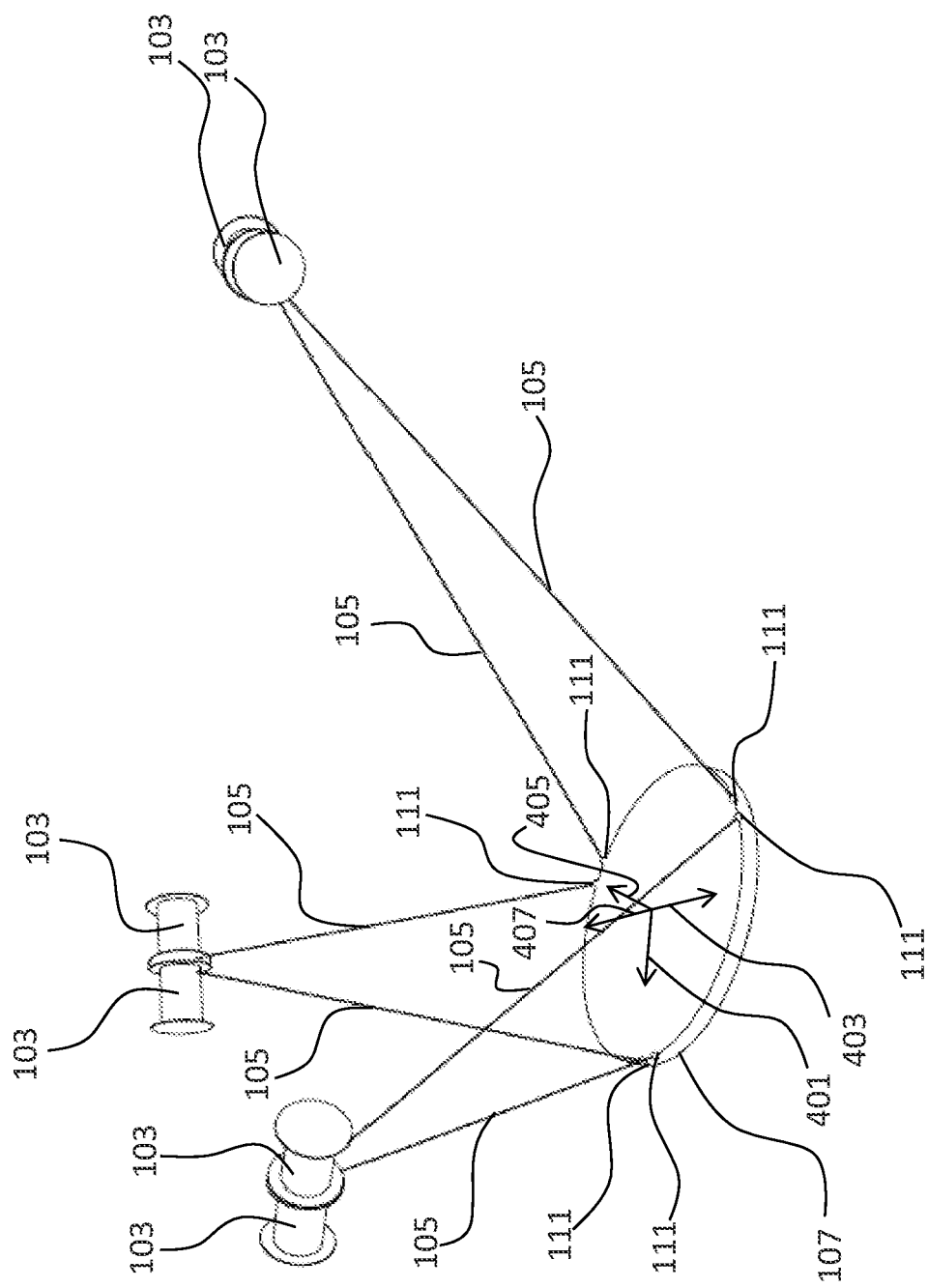
FIG. 4 shows the suspended flying rig system positioning and orienting a load support according to an exemplary embodiment of the disclosure.
Figure 5:
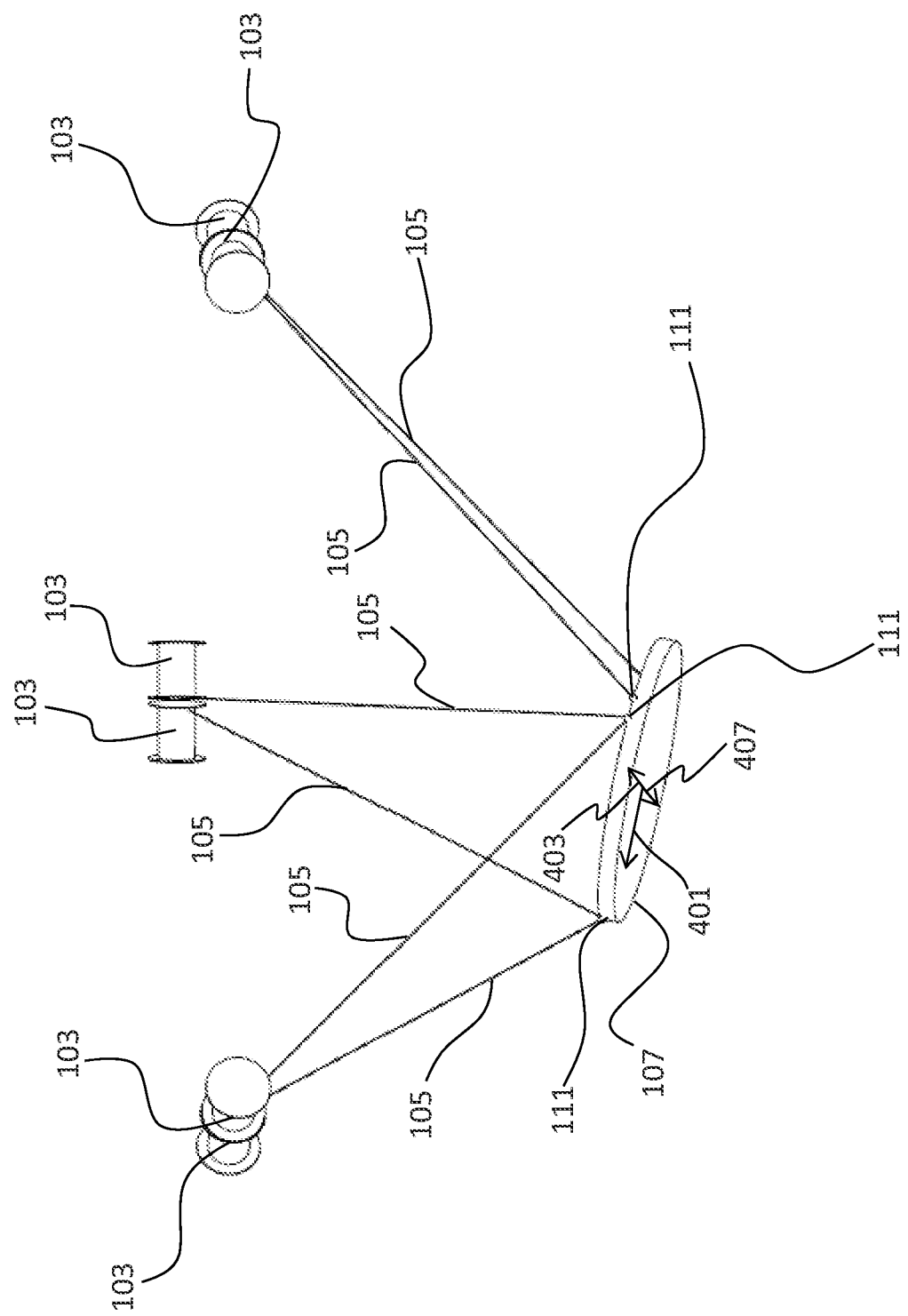
FIG. 5 shows the suspended flying rig system positioning and orienting a load support according to an exemplary embodiment of the disclosure.
Figure 6:
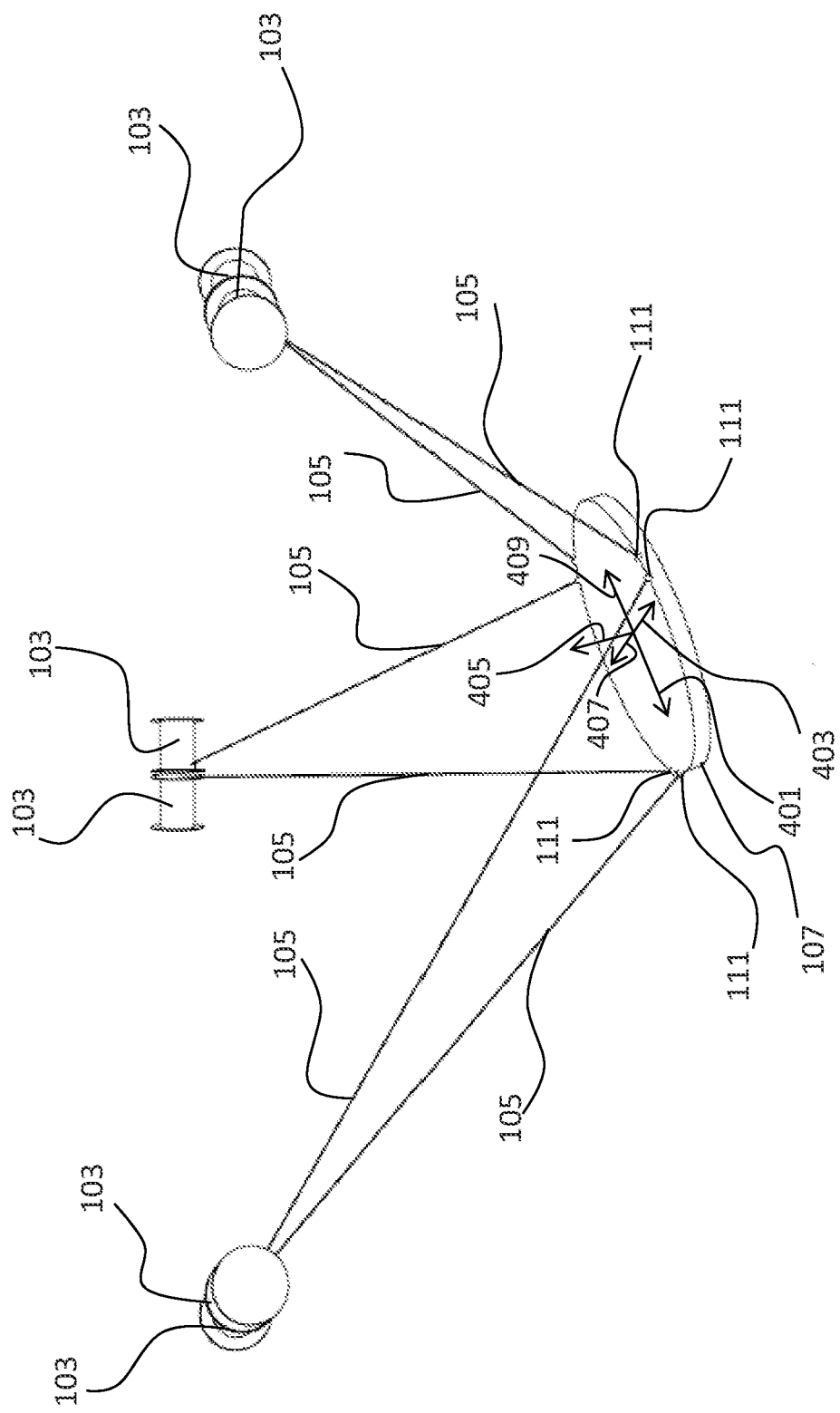
FIG. 6 shows the suspended flying rig system positioning and orienting a load support according to an exemplary embodiment of the disclosure.

FIGS. 4-6 show exemplary motion of load support 107. As the cables are individually retracted and/or deployed, motion is provided to the load support 107 that allows pitching, yawing and rolling motions. In FIG. 4, a first portion 401 (portions are indicated by directional arrows extending along or at an orientation to a surface of load support 107) is pitched slightly upward by increased retraction of cables 105 attached near first portion 401. In addition, a second portion 403 and third portion 405 (extending outwardly from the plane established by first portion 401 and second portion will 403) may be manipulated to provide roll and yaw, respectively. In this embodiment, the first portion 403 is positioned in front of and above a fourth portion 407 that is opposite first portion 403 by reduced retraction by the cables 105 attached near second portion 403 relative to cables attached near fourth portion 407.

In FIG. 5, the first portion 401 is pitched upwardly sharply by increased retraction of cables 105 attached near the front portion 401. In addition, second portion 403 and fourth portion 407 are maintained at substantially the same height. In FIG. 6, first portion 401, the second portion 403 and fourth portion 407 are yawed counterclockwise (as viewed from above load support 107) or rotated about third portion 405 by retracting one of the cables 105 near each attachment point 111 and deploying the other cable 105 at the attachment point. In addition, the first portion 401 and a fifth portion 409 may be manipulated to provide a rolling motion. In this embodiment, the fifth portion 409 which is opposite first portion 401 is positioned above first portion 401 by greater retraction by the cables 105 attached near fifth portion 409 relative to cables 105 attached near fifth portion 409. It is to be understood that other combinations of retraction/deployment of cables 105 may result in different movements of load support 107.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A suspended flying rig system comprising:
   a plurality of cables attached to a load support; wherein the plurality of cables includes at least three pairs of cables attached to the load support, attachment points of each pair of cables of the at least three pairs of cables to the load support are separated by a first spacing that is greater than a second spacing separating attachment points of cables of adjacent pairs of cables of the at least three pairs of cables to the load support;
   in response to retraction and/or deployment of at least one of the plurality of cables, motion is provided generally within a three-dimensional working space to the load support;
   wherein the motion includes at least six degrees of freedom and movement along at least three axes and rotation about the at least three axes; and the at least three axes are mutually perpendicular to each other.

2. The system of claim 1, wherein the rotation about the at least three axes includes a roll, pitch and yaw.

3. The system of claim 1, wherein a plurality of winch assemblies are assembled to a support structure.

4. The system of claim 1, wherein a plurality of pulleys for guiding the plurality of cables are mounted to a support structure.

5. The system of claim 4, wherein the plurality of pulleys are arranged within or on guides that move the plurality of pulleys, providing dynamic res-sizing and re-shaping of the three dimensional space.

6. A method for positioning and orienting a load generally within a three-dimensional working space comprising:
   providing a suspended flying system comprising a plurality of cables attached to a load support; wherein the plurality of cables includes at least three pairs of cables attached to the load support, attachment points of each pair of cables of the at least three pairs of cables to the load support are separated by a first spacing that is greater than a second spacing separating attachment points of cables of adjacent pairs of cables of the at least three pairs of cables to the load support; and
   selectively retracting and deploying at least one of the plurality of cables to achieve a motion of the load support that includes at least six degrees of freedom;
   wherein said motion includes movement along at least three axes and rotation about the at least three axes and said at least three axes are mutually perpendicular to each other.

7. The method of claim 6, wherein the rotation about the at least three axes includes a roll, pitch and yaw.

8. The method of claim 6, further providing a plurality of winch assemblies assembled to a support structure for receiving the plurality of cables.

9. The method of claim 6, further providing a plurality of pulleys mounted to a support structure for guiding the plurality of cables.

10. The method of claim 9, further arranging the plurality of pulleys within or on guides that move the plurality of pulleys, providing dynamic re-sizing and re-shaping of the three-dimensional working space.

* * * * *